United States Patent
Renner, Jr.

(10) Patent No.: US 6,243,827 B1
(45) Date of Patent: Jun. 5, 2001

(54) MULTIPLE-CHANNEL FAILURE DETECTION IN RAID SYSTEMS

(75) Inventor: William F. Renner, Jr., Baltimore, MD (US)

(73) Assignee: Digi-Data Corporation, Jessup, MD (US)

( * ) Notice: Subject to any disclaimer, the term of this patent is extended or adjusted under 35 U.S.C. 154(b) by 0 days.

(21) Appl. No.: 09/108,015

(22) Filed: Jun. 30, 1998

(51) Int. Cl.[7] ................................................... H05K 10/00
(52) U.S. Cl. .................................................................. 714/6
(58) Field of Search .................................. 711/112, 114; 714/2, 6

(56) References Cited

U.S. PATENT DOCUMENTS

| | | |
|---|---|---|
| 4,598,357 | 7/1986 | Swenson et al. . |
| 4,945,535 | 7/1990 | Hosotani et al. . |
| 5,166,936 | 11/1992 | Ewert et al. . |
| 5,249,288 | 9/1993 | Ippolito et al. . |
| 5,271,012 | 12/1993 | Blaum et al. . |
| 5,274,799 | 12/1993 | Brant et al. . |
| 5,285,451 | 2/1994 | Henson et al. . |
| 5,412,661 | 5/1995 | Hao et al. . |
| 5,418,921 * | 5/1995 | Cortney et al. ................. 711/114 |
| 5,463,765 | 10/1995 | Kakuta et al. . |
| 5,469,453 | 11/1995 | Glider et al. . |
| 5,479,611 | 12/1995 | Oyama . |
| 5,526,482 | 6/1996 | Stallmo et al. . |
| 5,548,711 | 8/1996 | Brant et al. . |
| 5,564,011 | 10/1996 | Yammine et al. . |
| 5,572,659 | 11/1996 | Iwasa et al. . |
| 5,574,856 | 11/1996 | Morgan et al. . |
| 5,574,882 | 11/1996 | Menon et al. . |
| 5,600,783 | 2/1997 | Kakuta et al. . |
| 5,617,425 | 4/1997 | Anderson . |
| 5,636,359 | 6/1997 | Beardsley et al. . |
| 5,644,697 | 7/1997 | Matsumoto et al. . |
| 5,657,439 | 8/1997 | Jones et al. . |
| 5,889,934 * | 3/1999 | Peterson .................................. 714/6 |
| 5,974,544 * | 10/1999 | Jeffries et al. ......................... 713/1 |

OTHER PUBLICATIONS

Ridge, Peter M. The Book of SCSI: A Guide for Adventurers. Chapter H: An Introduction to RAID. pp. 323–329. 1995 William Pollock, publisher.

Pankaj Jalote Fault Tolerance in Distributed Systems. Section 3.3.1 Problem Definition, pp. 100–101. 1994 P T R Prentice Hall.

* cited by examiner

*Primary Examiner*—John F. Niebling
*Assistant Examiner*—Stacy A Whitmore
(74) *Attorney, Agent, or Firm*—William S. Ramsey

(57) ABSTRACT

This invention is a software-based method for facilitating the recovery of a RAID storage system from the simultaneous failure of two or more disks (catastrophic failure). It involves the identification of the logical address and length of the failed areas of the failed disks and the writing of this information into a bad region table which is replicated on each disk. This makes it easier and less expensive to identify the problem areas and make the necessary repairs.

4 Claims, 17 Drawing Sheets

MULTIPLE-CHANNEL FAILURE DETECTION IN RAID SYSTEMS

CROSS-REFERENCE TO RELATED APPLICATIONS.

Not Applicable.

STATEMENT REGARDING FEDERALLY SPONSORED RESEARCH OR DEVELOPMENT.

Not Applicable.

BACKGROUND OF THE INVENTION

(1) FIELD OF THE INVENTION

This invention relates to RAID systems in which multiple-channel failure is detected and the diagnostic information recorded.

(2) DESCRIPTION OF RELATED ART INCLUDING INFORMATION DISCLOSED UNDER 37 CFR 1.97 AND 37 CFR 1.98.

The acronym RAID refers to systems which combine disk drives for the storage of large amounts of data. In RAID systems the data is recorded by dividing each disk into stripes, while the data are interleaved so the combined storage space consists of stripes from each disk. RAID systems fall under 5 different architectures, plus one additional type, RAID-0, which is simply an array of disks and does not offer any fault tolerance. RAID 1–5 systems use various combinations of redundancy, spare disks, and parity analysis to achieve conservation reading and writing of data in the face of one and, in some cases, multiple intermediate or permanent disk failures. Ridge, P. M. *The Book Of SCCSI: A Guide For Adventurers*. Daly City Cal. No Starch Press. 1995 p. 323–329.

It is important to note that multiple disk failures (catastrophic failure) are not supposed to occur in RAID systems. Such systems are designed so disk failures are independent and the possibility that a second disk will fail before the data on a first failed disk can be reconstructed will be minimal. In order to shorten this susceptible period of "degraded" operation, a spare disk is frequently provided so the reconstruction of the failed disk can begin as soon as a failure is detected. Nevertheless, multiple disk failures do occur for a number of more or less unlikely reasons, such as a nearby lightning strike causing a power surge, or a physical tremor shaking the disks and disrupting the read/write heads over multiple disks. Such events can create logically invalid regions. This invention is equally useful for identifying logically invalid regions of disks whether the region in question is also physically bad.

Multiple disk failures may be classified in two categories:

A. local or B. transient failures. Such failures stem from medium errors, localized hardware errors, such as corruption of track data, and bus errors. Type A and B errors are handled by retries. The retries are made automatically; the number of retries depends on the number of disks in the array and the demands on the system, including the errors detected in the other disks of the array.

C. Burst or severe errors. Such errors are seen over a large range of addresses or cause the disk to become inaccessible after an attempt is made to access a certain region. Type C errors are handled by failing a disk with powering down of the entire system. Type C errors are also referred to as "catastrophic" errors.

A system which is downed by a type C error is restored by the following steps. 1. The system is repowered. 2. An attempt is made to restore the failed disk through redundancy. 3. The failed disks are replaced and reconstructed.

Other classifications of failures have been proposed, for example, the following: 1. Transient failures. Unpredictable behavior of a disk for a short time. 2. Bad sector. A portion of a disk which cannot be read, often for physical reasons. 3. Controller failure. The disk contents are unaffected, but because of controller failure, the disk cannot be read. 4. Disk failure. The entire disk becomes unreadable, generally due to hardware faults such as a disk head crash. Pankaj Jalote, Fault Tolerance in Distributed systems, Prentice hall, Englewood Cliffs, N.J., 1994, pages 100–101.

Disk arrays which allow writeback-caching are subject to the danger of losing data which have been accepted from the host computer but which have not been written to the disk array. RAID-0 systems have no redundancy and no error protection. RAID 1–5 systems provide error correction for the loss of a single channel through parity methods. Error-detection in the event of multiple channel failure, however, cannot be guaranteed. Under these circumstances, data may be correctly written on some channels but not on others, a falsely valid parity might be returned, and corrupted data may be returned. If the unit must be powered down to correct the situation before the array can be brought back online, there may be no opportunity to rewrite the data successfully and live write-back data may also go unwritten.

Faulty cache memory may produce apparent multiple-disk errors of a persistent nature. For example, cache data with incorrect parity may generate bad SCSI parity on both the data channel and on the parity channel. In this case, when a write to disk is performed, two disks will report that the data are invalid.

The sharing of one bus between many disks, as is commonly done on RAID systems, creates a single point of failure in the bus which increases the probability of "two channel" failure. For example, in an array of five channels (four data channels and one parity channel) with each channel serving five disks, the failure of a single bus means than an error on any one of the 20 disks on the four other data channels will be unrecoverable. This has the same effect as a two channel failure.

In the present invention, a table of address ranges which have not been successfully written to a parity stripe is replicated on one disk on each channel in the array with frequent updating. After a catastrophic failure of multiple disks, assuming at least one of those disks can be written to, there will be a record of the failure on some disk. Since the record is on many disks, rather than only on the disk which experienced the failure, the controller can generate a list of all regions where data have been lost after the array has been repaired, even if the unit must be powered down before such a repair can be performed. This reduces the loss of down time for the system and reduces the cost of restoring the system.

The RAID Advisory Board has provided a summary of criteria for the classification of RAID systems with respect to reliability. Http://www.raid-advisory.com/EDAPDef.html. It is expected that the present invention will be useful in the development of "Failure Tolerant Disk Systems (FTDS) and Disaster Tolerant Disk Systems (DTDS).

U.S. Pat. No. 4,598,357 discloses a system in which data involved in a writeback error are reassigned to an unused portion of a working disk. The location of areas from which data have been lost are not recorded.

U.S. Pat. No. 4,945,535 discloses an address control device which, when it detects an error in a data word read from a main memory device, changes the address of that error and does not use the memory area in subsequent data writes.

U.S. Pat. No. 5,166,936 discloses a method for automatically remapping a disk by removing a bad sector and replacing it with a good track of data. A flag is set during the process so that should power fail the process can be restarted.

U.S. Pat. No. 5,249,288 discloses an electronic printing system which identifies physically bad areas and remaps them through file allocation.

U.S. Pat. No. 5,271,012 discloses a RAID system tolerant to failure of two disks which uses the double generation of parity information using alternate rows and diagonals of direct access storage devices.

U.S. Pat. No. 5,274,799 discloses a RAID 5 system in which the copyback cache storage unit is used to store peak load data and completes the write function during relatively quiescent periods.

U.S. Pat. No. 5,285,451 discloses a mass memory system capable of tolerating two failed drives in which a number of disk drives are coupled to an equal number of buffers by X-bar switches. The switches couple and decouple functional and nonfunctional drives as necessary.

U.S. Pat. No. 5,412,661 discloses a data storage system in which disks are arrayed and each disk is controlled by two disk controllers. The system is tolerant of the failure of any one controller and has hot spare disks to accommodate disk failure.

U.S. Pat. No. 5,463,765 discloses a process in which invalid blocks of data are stored in a new location and used to recover the data of the faulty drive.

U.S. Pat. No. 5,479,611 discloses an error-correction technique in which data from a bad block on a disk are reassigned and reconstructed without the use of a cache memory.

U.S. Pat. No. 5,469,453 discloses a mass data storage apparatus in which bad blocks are time stamped and given a logical address. Comparison of the addresses and time stamps allows determination of failures of the writing devices.

U.S. Pat. No. 5,526,482 discloses a fault-tolerant storage device array in which at least two redundant copies of each pending data block are retained in the array controller's buffer memory and the copyback cache storage unit, providing protection against buffer failure.

U.S. Pat. No. 5,548,711 discloses a system including a DATA-RAM and a SHADOW-RAM. Write data from the CPU is stored in two independent memories to insure that pending Write data are not lost.

U.S. Pat. No. 5,564,011 discloses a non-RAID system in which critical data is replicated and used to regenerate failed control blocks.

U.S. Pat. No. 5,572,659 discloses an adapter for mirroring information on two channels which detects the failure of one channel and reads and writes from the other channel.

U.S. Pat. No. 5,574,856 discloses a storage device array in which data blocks of converted data are labeled with predetermined code bits which indicate the operation in which a fault occurs. In the presence of a fault, a data reconstruction operation and a data reassignment operation are indicated.

U.S. Pat. No. 5,574,882 discloses a system for identifying inconsistent parity in an array of storage in which a bit map of inconsistent parity groups is created.

U.S. Pat. No. 5,600,783 discloses a disc array system in which data for a faulty disc is stored in a cache until the disc is replaced.

U.S. Pat. No. 5,617,425 discloses an array supporting system in which drive controllers accept responsibility from the array controller for detecting write errors and reallocating data away from faulty discs.

U.S. Pat. No. 5,636,359 discloses a performance enhancement system which uses a directory means to prevent errors in the reading and writing of data.

U.S. Pat. No. 5,644,697 discloses a redundant array of disks in which the disks are divided into areas of varying size and having a single status table which indicates which areas are in use.

U.S. Pat. No. 5,657,439 discloses a system in which a logical region of a disk is used as a distributed spare for use in recovering data having errors.

Those prior art RAID systems tolerant to multiple disk failure exceeding the redundancy of the array depend on hardware, such as non-volatile memory or cache memory with a battery or extra disks, to cope with writeback cache loss in the event of multiple disk failure. The present invention uses only software and a small portion of reserved space on each disk to provide a reliable, inexpensive, widely applicable system for error-detection for write-back data lost during a catastrophic multiple disk failure.

BRIEF SUMMARY OF THE INVENTION

Catastrophic disk-array failures involve the failure of greater than one disk in a RAID 1–5 system, or any disk in a RAID 0 system. In almost all cases, however, there remains the ability of the controller to communicate with at least one disk in the array. The present invention uses software and a small portion of each disk in the array to write a bad area table on each disk. The bad area table provides the logical address and length of the area in the array's logical space which has been corrupted by physical damage on the media or other causes of write failure. After a catastrophic failure of multiple disks, assuming at least one disk can be written to, there will be a record of the failure on at least one disk. The record is on several disks, or at least one disk, rather than only on the disk which experienced the failure. The task of repairing the array is greatly simplified because all bad regions of the array can be easily identified. This reduces the loss of down time for the system and reduces the cost of restoring the system.

The process of writing failure records on one or more disks, as described in this patent, has the advantage of very rapidly recording the failure incident. It takes only about 20 milliseconds to record to a disk. Recording to flash memory can require a significantly longer time, up to several seconds in the worst case. The difference in recording time may be crucial under certain failure conditions, for example, in the case of a power failure recording to disk could be accomplished while recording to flash memory would fail.

This invention is a process for designating physically or logically invalid regions of storage units as a whole or fractional number of blocks on storage units on which data has been striped, in a fault-tolerant storage device array of a number of failure independent storage units which receive information from a writeback cache and a controller with a writeback cache. First, the logical address and length of the physically or logically invalid region is determined. Second, the address and length is written on a bad region table, and thirdly, the bad table region is replicated on each storage unit. The process may be used with storage units which are disks, tapes, or CDS which are connected to the controller. The process may be used when the bad region is due to a writeback, a read, or a write error, and in a system in which a number of storage units exceeding the redundancy have failed, or when the data is being restored or replaced on a spare storage unit or in a non-redundantly configured array. In addition to being replicated on two or more storage units, the bad region table may also be replicated in volatile memory with battery backup in the controller, or on additional storage units separate from the array of storage units. Finally, the process can include the steps of time-stamping entries and determining the most recent entry.

This invention is especially useful in connection with a host computer with a RAID system which is periodically backed up to tape and which participates in a distributed system through a network. In the absence of this invention, corrupted data could be sent to the host and then propagated through the network to other nodes in the distributed system. With our invention, the data would be recognized as invalid or lost by the host system, and there would exist no danger of corrupted data leaving the local node or being used for processing by the local node. The backup tape would then be used to roll the node back to an earlier, consistent configuration.

This invention is also especially useful in a system with two RAID arrays software-mirrored by the host computer's operating system. After the occurrence of a catastrophic system crash, the host could reassemble all data which is correct on either of the two arrays, using the present invention. Without this invention, the host could not identify which blocks were in error on which RAID device.

The objective of this invention is to provide an inexpensive means for identifying the locus of catastrophic failure of RAID 0–5 systems.

Another objective is to provide means for rapid identification of failed areas in a RAID 0 system with no redundancy.

Another objective is to provide means for rapid identification of failed areas in RAID 2–5 systems which utilize parity to correct single disk failures.

Another objective is to provide means for inexpensive catastrophic failure identification which do not require hardware other than small areas of the storage disks.

Another objective is to provide software means widely adaptable to a variety of configurations of RAID 0–5 systems for identification of the sites of catastrophic failures.

A final objective is to facilitate the rapid recovery of RAID 0–5 systems from catastrophic failure occasioned by physical or logical sources.

DETAILED DESCRIPTION OF THE INVENTION.

Figure 1:
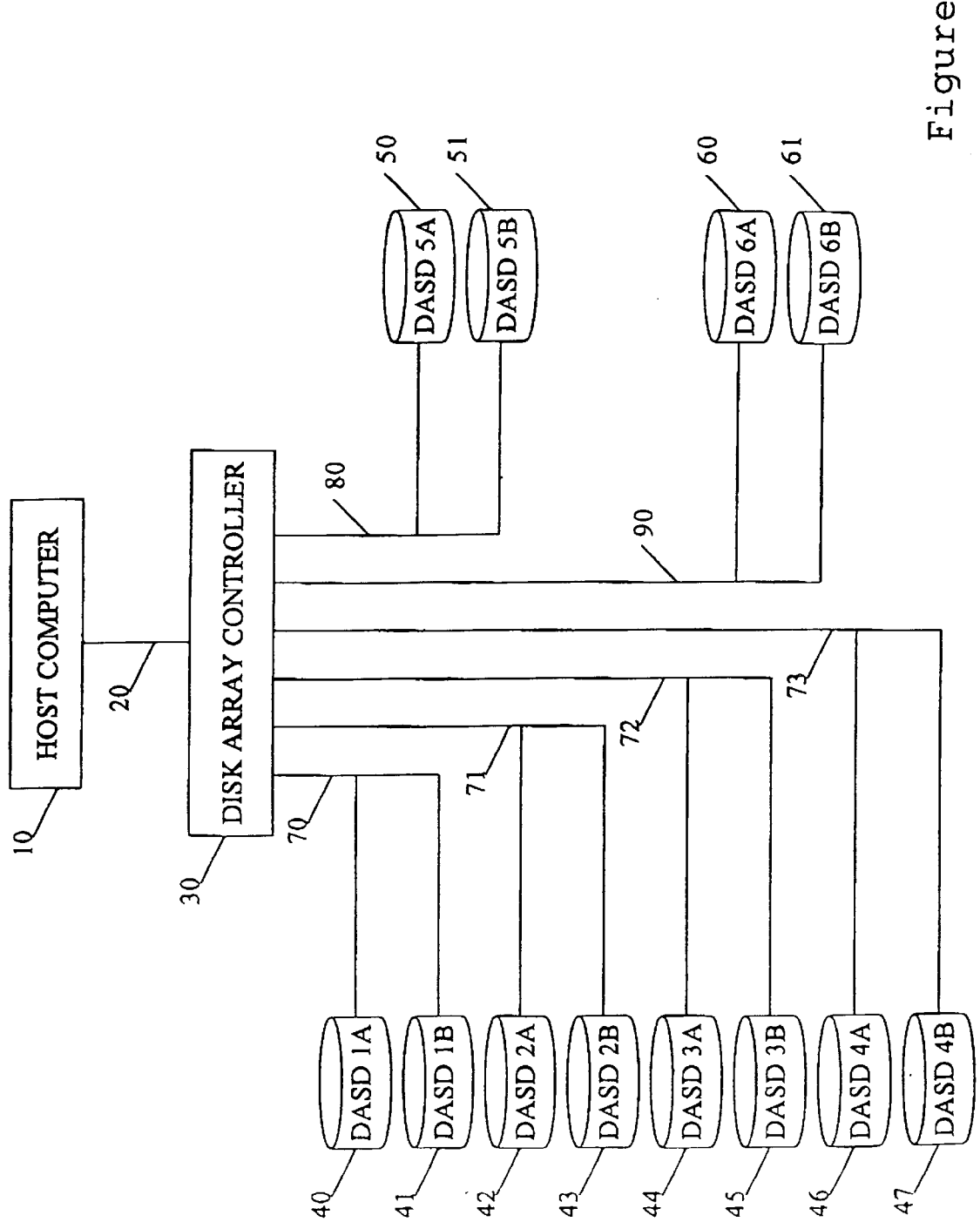
FIG. 1 is a schematic of the external view of the array, disk array controller, and host computer.

FIG. 1 is a schematic of the external view of a RAID 3 system comprising a single host computer, a RAID controller, and two tiers of 5 Direct Access Storage Device (DASD) units with two parity DASDs and two additional hot-spare DASDs which incorporates the invention. All the DASDs in a system taken as a whole is referred to as an "array" of DASDs. A group of DASDs served by separate channels across which data is striped is referred to as a "tier" of DASDs. A DASD may be uniquely identified by a channel number and a tier letter, for example DASD 1A is the first disk connected to channel 1 of the controller.

A preferred controller is the Z-9100 Ultra-Wide SCSI RAID controller manufactured by Digi-Data Corporation, Jessup Md.

The host computer 10 is connected by the host small computer system interface (SCSI) bus 20 to the disk array controller 30. Disk array controller 30 is connected to DASD IA 40 and DASD 1B 41 via the channel 1 disk SCSI data bus 70; to DASD 2A 42 and DASD 2B 43 via the channel 2 disk SCSI data bus 71; to DASD 3A 44 and DASD 3B 45 via the channel 3 disk SCSI data bus 72; and to DASD 4A 46 and DASD 4B 47 via the channel 4 disk SCSI data bus 73; respectively. Parity DASD 5A 50 and 5B 51 are connected to the Disk Array Controller 30 by the channel 5 SCSI parity disk bus 80. Spare DASD 6A 60 and 6B 61 are connected to Disk Array Controller 30 by the channel 6 SCSI hot spare disk bus 90.

Additional tiers of DASDs may be used. Additional host channels and host computers may be used on the system.

Any suitable host computer may be used.

Figure 2:
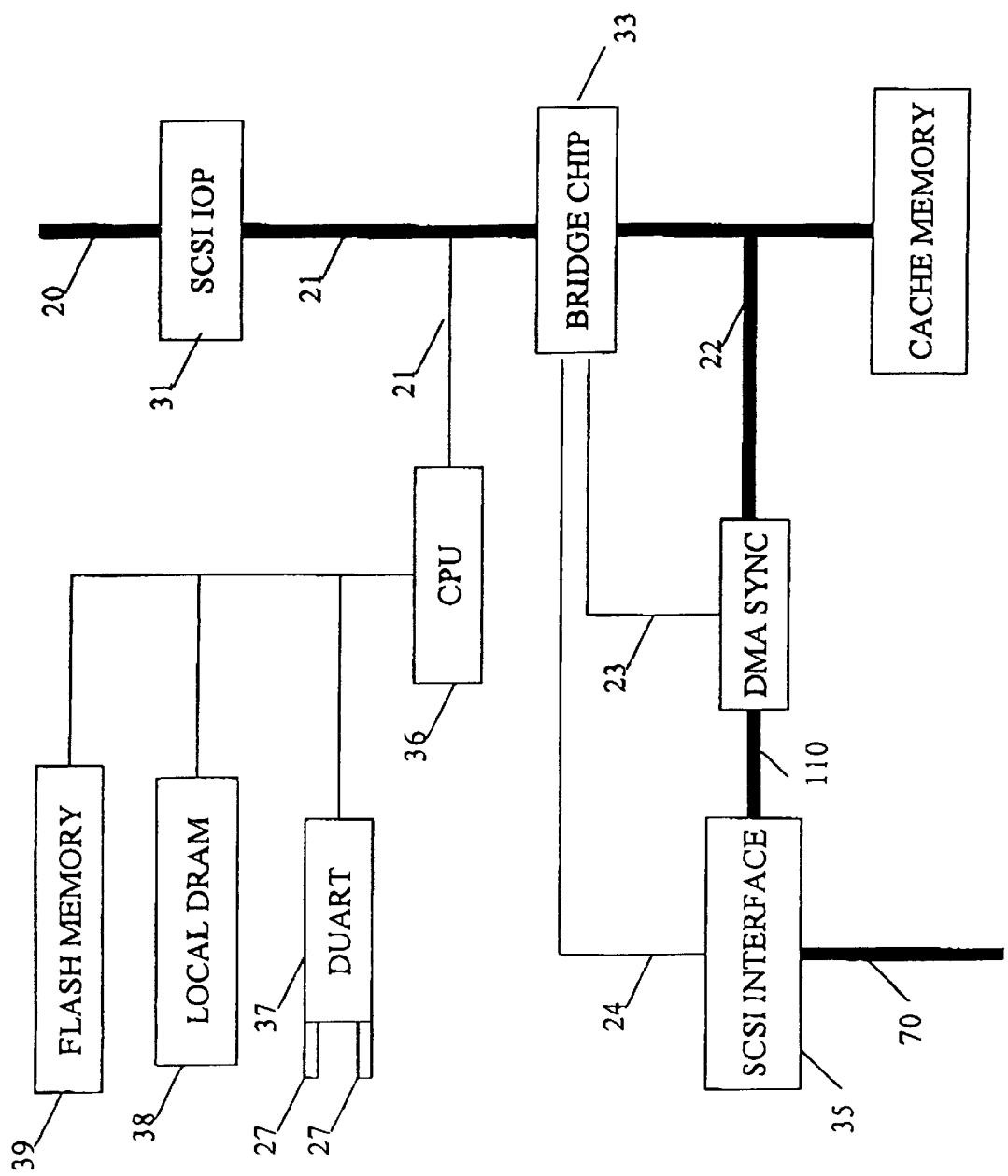
FIG. 2 is a schematic of the system architecture showing only one channel.

FIG. 2 is a schematic of the system architecture of the disk array controller (30 in FIG. 1) showing one disk channel and one host channel only. The flow of data between host and disk array is indicated by the heavy line. Data is received from the host computer via the host SCSI bus 20 into the SCSI input/output processor (SCSI IOP) 31. The SCSI IOP initiates memory transactions to or from the cache memory 32 through the bridge chip 33 which bridges the system bus and the cache bus. A cache bus 22 connects the bridge chip 33, cache memory 32, and the hardware control mechanism DMA Sync 34. The DMA Sync acts as a direct memory access (DMA) controller with the additional RAID-3 function of parity generation and checking and replacement of data with a hot spare. It also generates reads or writes to specific cache addresses and translates the data between the cache bus 22 and the SCSI interface chip 35 on the individual channel. The DMA Sync also controls the necessary hardware handshaking signals for direct memory access (DMA). Although only one SCSI interface chip 35 and SCSI disk bus 70 is shown in FIG. 2, there are as many of these components as there are busses of DASDs. The SCSI interface chip 35 is connected by connector 24 to bridge chip 33. The DMA Sync 34 is connected by connector 23 to the bridge chip 33. The non-volatile flash electrically erasable programmable read-only memory (EEPROM) 39 stores parameters for the controller and the system firmware, which is uncompressed from the flash into 4 Megabyte local dynamic random-access memory (DRAM) 38 when the system is booted. A DUART chip 37 has two RS-232 connectors 27 which allow the user to configure the unit through a command line interface and also provide communication between the unit and a workstation running debugging software. The flash memory 39, local DRAM 38, DUART chip 37 and CPU 36 and system bus 21 are connected by a processor bus 25. Both the SCSI interface chip 35 and the DMA Sync 34 are programmed by the CPU 36 through the system bus 21 and the bridge chip 33.

A preferred CPU 36 is an Intel 960RP available from Intel Corporation, Santa Clara, Calif. A preferred SCSI IOP 31 is a Symbios SYM53C875 available from Symbios Logic Incorporated, Colorado springs, Colo. A preferred system bus 21 is a 32-bit bus designed in accordance with the Peripheral Controller Interconnect (PCI) specification. A preferred SCSI interface chip 35 is a QLOGIC FAS366U Ultra Wide SCSI interface chip available from QLogic Corporation, Costa Mesa, Calif.

Figure 3:
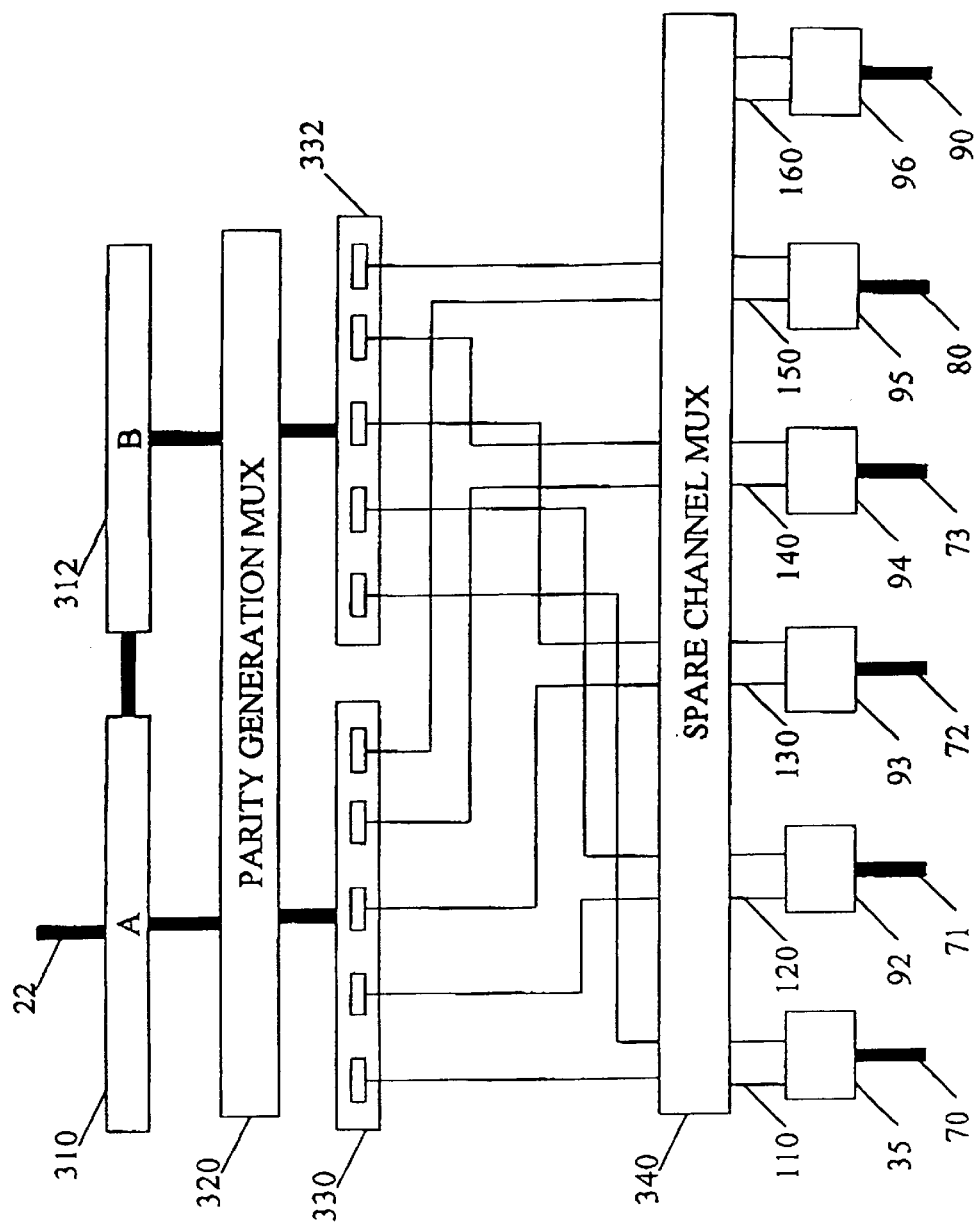
FIG. 3 is a schematic of the DMA sync hardware.

FIG. 3 is a schematic of the DMA sync hardware. The controlling state-machine and related signals and registers, including handshaking signals, are omitted from this schematic. Data enter and exit the DMA sync (34 in FIG. 2) via the cache bus 22 and the individual channel interface chips in the SCSI Interface 35. Data enter and exit the DMA sync (34 in FIG. 2) via the cache bus 22 and data buses 110, 120, 130, 140, 150, 160 to the individual channel interface chips 35, 92, 93, 94, 95, 96. During a write from cache to disk, data from the cache bus is latched in two 36 bit registers 310, 312 from which a parity byte is generated by parity-generating circuitry 320. The eight data bytes and two parity bytes are latched in two sets of five 9 bit registers 330, 332. The data are then rearranged to be byte-striped across the disks and are passed to a multiplexor 340 to provide data for the spare channel if it is to be used. For reads from disk to cache the process is reversed.

Figure 4:
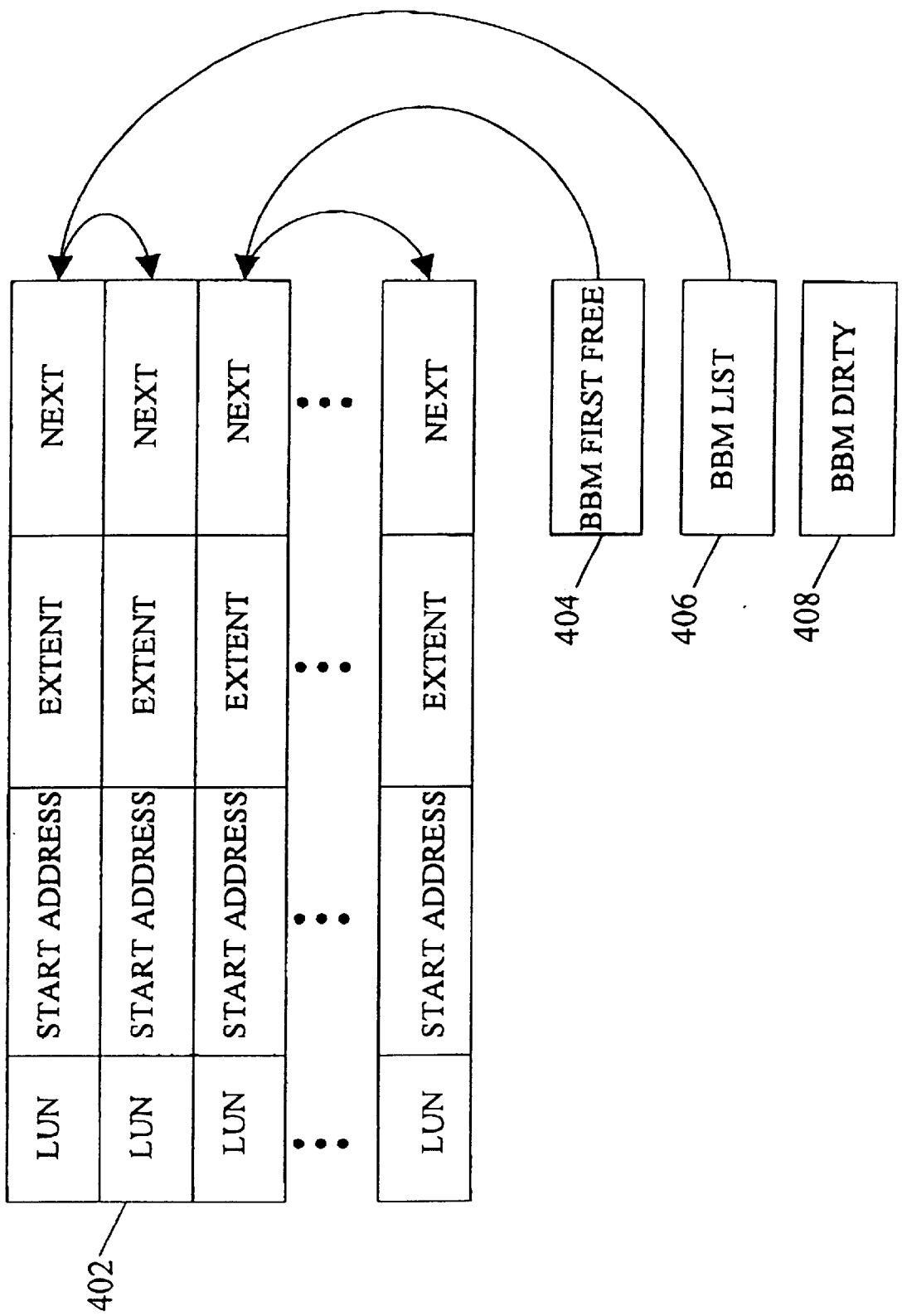
FIG. 4 is a flowchart of the portion of the system boot process relevant to the present invention.

FIG. 4 is a diagram of the data structure used for bad block management, herein referred to as the BBM MAP, which is maintained in the controller's memory. The BBM MAP consists of an array of individual records called the BBM TABLE 402. Each record describes a region which has been determined to be invalid. The fields contained in the record have the following meanings. LUN refers to the SCSI logical unit through which the host computer would access the invalid region. START ADDRESS indicates at what logical block address within the LUN the invalid region starts. EXTENT indicates for how many logical blocks from START ADDRESS the invalid region extends. The pointer NEXT is used as a linkage field so that the elements within the BBM TABLE 402 can be organized into linked lists. Additionally, the BBM MAP contains BBM FIRST FREE 404, a pointer to the first unused entry in the BBM TABLE, BBM LIST 406, a pointer to the first entry in the BBM TABLE 402 which describes an invalid region, and BBM DIRTY 408, a boolean value which indicates whether the table has been altered since it was last saved to the disk array. The unused entries in the BBM TABLE 402 are organized into a linked list of which BBM FIRST FREE 404 is the head, and the entries describing invalid regions are organized into a linked list of which BBM LIST 406 is the head. In FIG. 4, the table is shown as containing two unused entries and two used entries.

In the discussions which follow, the following notation for the comparison of entries in the BBM TABLE 402 will be employed to simplify the discussion. When used to compare entries for which the value of the LUN field is identical, START(X) will be taken to mean the value of an entry's START ADDRESS field, where X refers to the entry in question. Similarly, END(X) will be taken to mean the sum of the entry's START ADDRESS and EXTENT fields minus one, which is the last logical block address described by the entry as invalid. In comparisons between entries describing regions of different LUNs, it is defined that END(Y)+1<START(Z) for any regions Y and Z for which the value of entry Y's LUN field is less than the value of entry Z's LUN field. In this way, the address spaces of all of the LUNs represented by the controller unit are flattened into a single, larger address space for purposes of ordering and comparison. The notation NEXT(X) will be taken to mean the entry referred to by entry X's NEXT field.

Since the maintenance of linked lists through insert and delete operations and the use of free lists to dynamically allocate elements from within a static structure are well known in the art, these will not be further elaborated. In the discussion which follows, operations which attempt to allocate an unused entry from the BBM TABLE 402, returning a failure code if none is available, and which return an entry no longer needed to the pool of free entries will be assumed, as will an operation to sequence the linked list structure prior to saving to disk and an operation to restore the original structure from an image on disk. The product of this operation, to which are appended a timestamp and a marker to indicate that the data is thus formatted, will be referred to as a BBM STAMP. All of these processes are well known in the art. Within the linked list BBM LIST 406 the additional property is preserved that for each entry A which is followed by entry B in the list, END(A)+1<START(B), which implies that the entries are ordered, that they do not overlap and that they are noncontiguous.

Figure 5A:
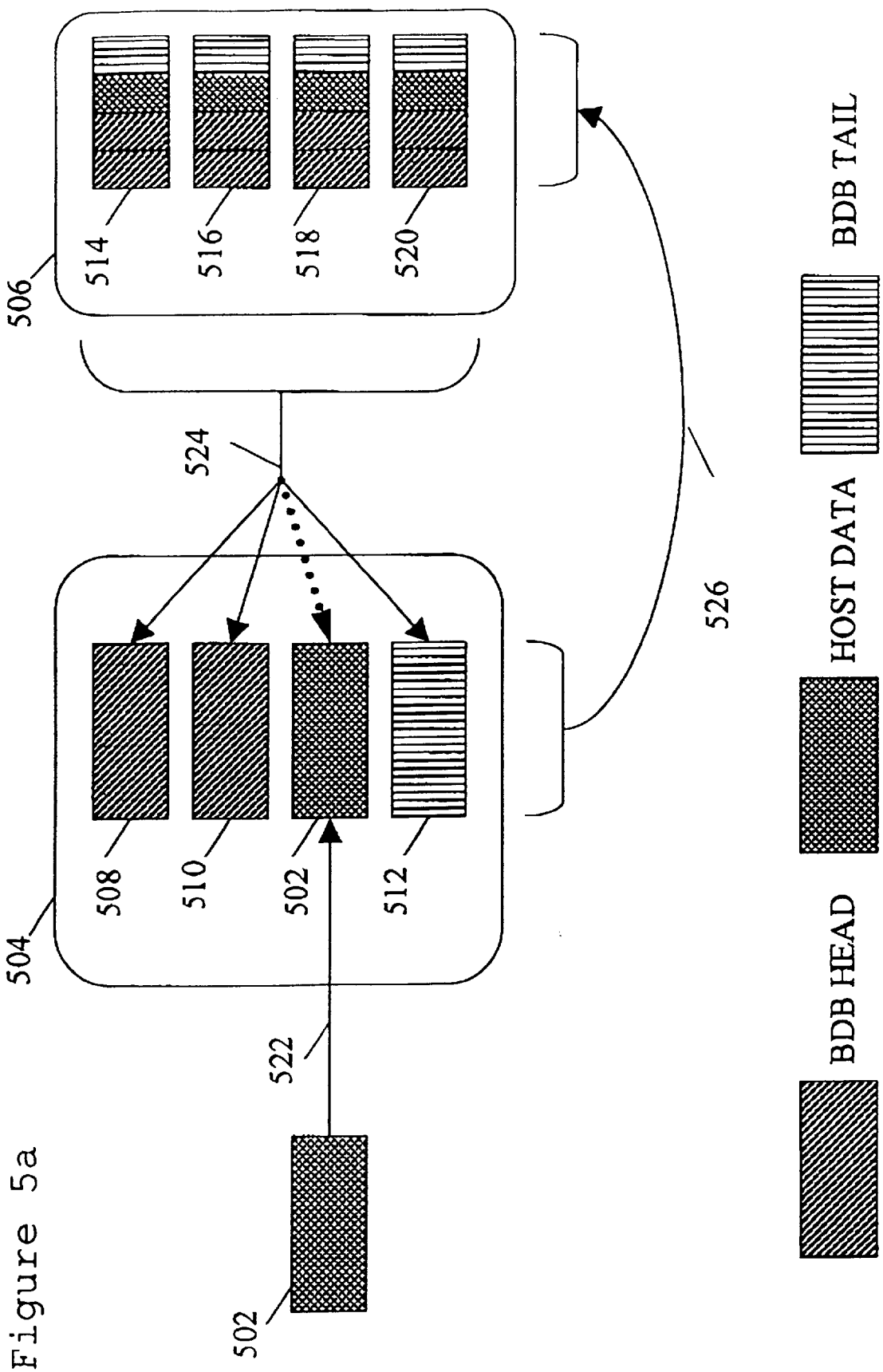
FIGS. 5a and 5b are flowcharts of the routine which is invoked periodically to update the bad block tables on the disks.
Figure 5B:
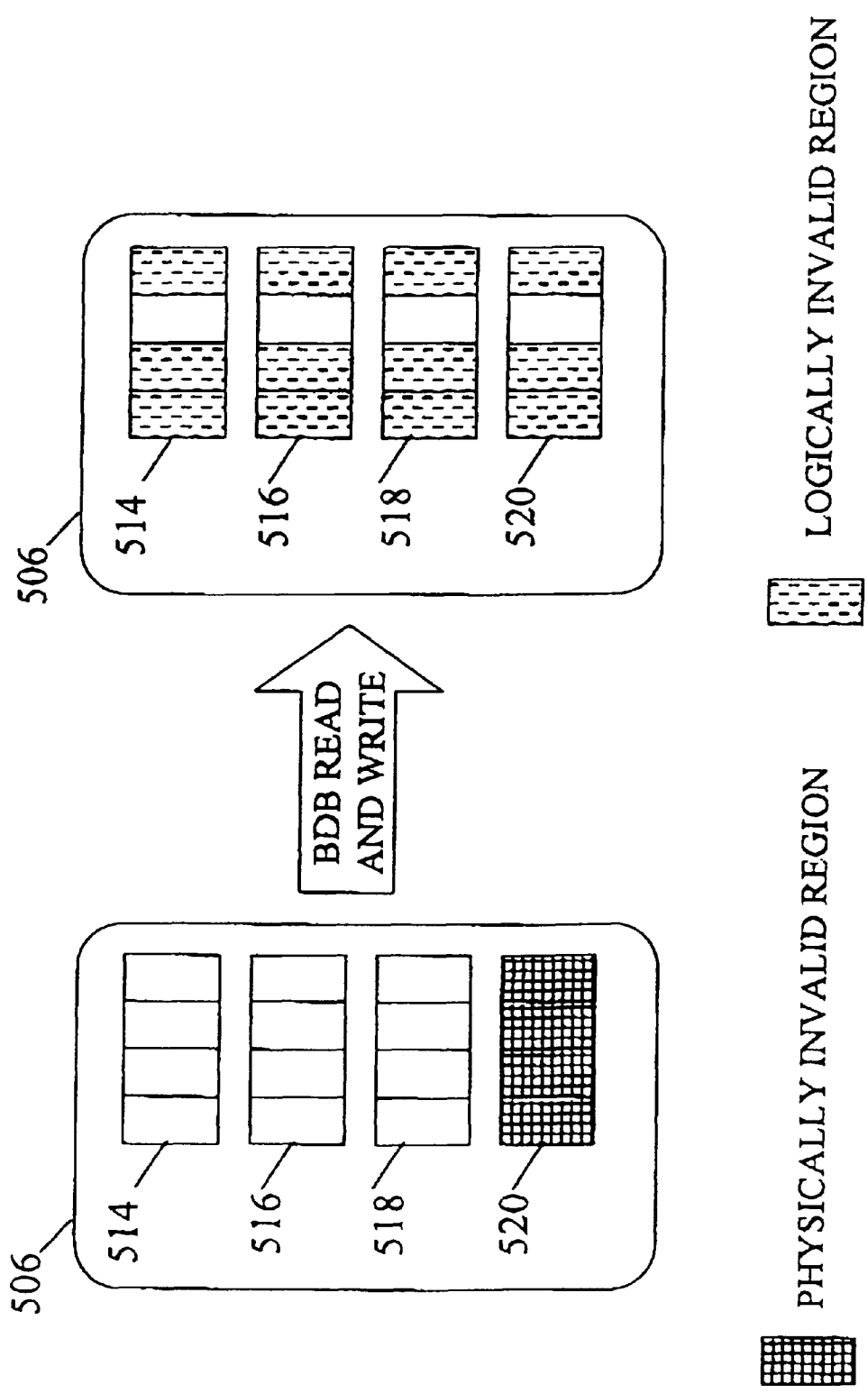

FIGS. 5a and 5b depict the read-modify-write process known as blocking/deblocking, performed prior to certain write operations which a host computer may initiate by a controller which byte-stripes data onto a set of disks. Many devices, including host adapter cards and disks, support only a fixed size for logical blocks, which is the minimum unit of data which can be transferred to or from the device. For SCSI devices, this fixed size is frequently 512 bytes. Unless the host computer supports a block-size which is a multiple of the block-size supported by the storage units in the array multiplied by the number of storage units across which the data is to be striped, the possibility exists for the host computer to request a write which alters only a fractional portion of a disk block. In this case, the controller must read the data which is recorded on the block in question prior to performing the write in order to avoid corrupting the data which shares the same blocks in the storage array with the host data to be written.

In FIG. 5a, a single block of data 502 is written by the host computer to the controller and placed in the controller's cache memory 504. Also shown in memory are three adjacent blocks 508, 510, 512 which together with 502 map onto the same set of four blocks 514, 516, 518, 520 on four different devices within the storage array 506. Such blocks with logical addresses preceding the host data to be written 508, 510 are referred to as a blocking/deblocking head (BDB head), and such blocks with logical addresses subsequent to the host data 512 are referred to as a blocking/deblocking tail (BDB tail). Arrow 522 depicts the process of host data being written into cache memory 504. Arrow 524 depicts the blocking/deblocking read of byte-striped data from the storage array into the cache memory 504. The portion of the data which corresponds to the block of host data 502 is shown in a dotted line to indicate that the data being transferred from the storage array 506 is blocked from overwriting the host data. In this way, the data from the host computer is merged with the other data which share the same set of blocks within the storage array 506. Arrow 526 depicts the combined data being written back to the storage array 506.

FIG. 5b shows the effect of an unrecoverable physical medium error on one block in the storage array during the blocking/deblocking operation of FIG. 5a, assuming no operational parity disk is available. In this case, the only logically valid area of the blocking/deblocking region after the operation is the data written by the host, since the portions of blocks 508, 510 and 512 which were stored in block 520 have been overwritten with invalid data and the data from those blocks which resides on disk blocks 512, 516 and 518 are not sufficient to reconstruct the entirety of the lost blocks.

Figure 6:
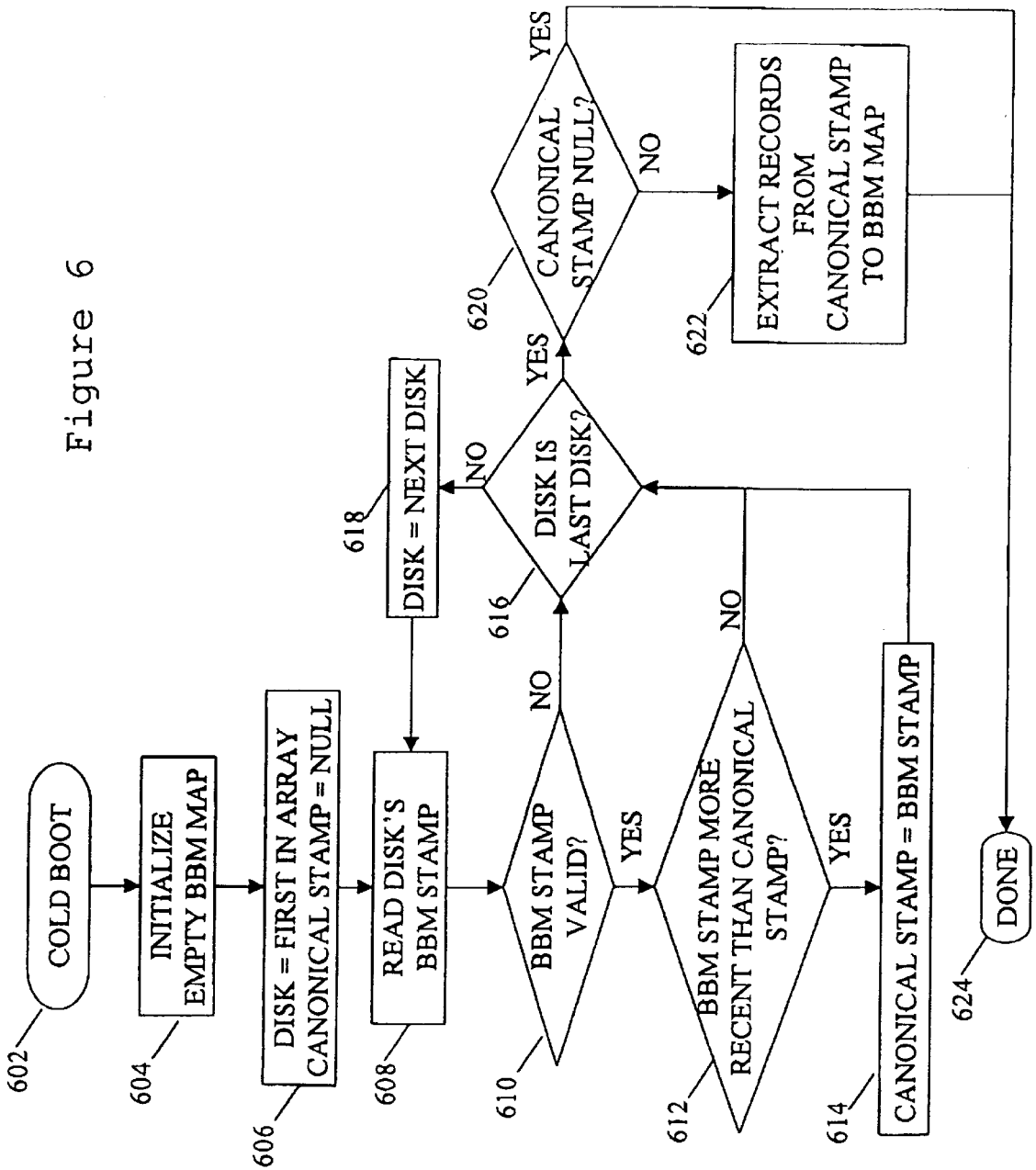
FIG. 6 is a flowchart of the routine which is invoked prior to a data operation on the disk array.

FIG. 6 is a flowchart of the steps pertaining to bad block management taken when the system boots. Block 602 is the entry point for the routine. In block 604 the system allocates memory for the BBM MAP structure and initializes it to contain no bad regions. Variables used to find a valid stamp in the disk array are initialized in block 604. The loop control variable DISK is set to indicate the first disk in the array, and a variable CANONICAL STAMP is set to a null value. In block 608 a stamp containing the bad block table is read from the disk referred to by DISK into a local buffer BBM STAMP, which is checked for a valid stamp format in block 610. If BBM STAMP is determined to be invalid, control passes to block 616 where the presence of other disks is checked. If there is another disk, it is assigned to DISK in block 618 and the loop repeats. If there is no other disk, control passes out of the loop to block 620. If BBM STAMP is valid in block 610, its timestamp is checked against the timestamp of CANONICAL STAMP (where the timestamp for a null stamp is defined to be older than any valid timestamp) in block 612. If it is more recent than CANONICAL STAMP, CANONICAL STAMP is set to BBM STAMP. Control then passes to block 616 for the next iteration of the loop. When there are no more disks to check, control passes to block 620, where CANONICAL STAMP is checked for a null value. If it is not null, then an appropriate stamp has been located, and all the bad regions described in CANONICAL STAMP are added to the BBM MAP in block 622. This portion of the boot-up process is completed in block 624.

Figure 7:
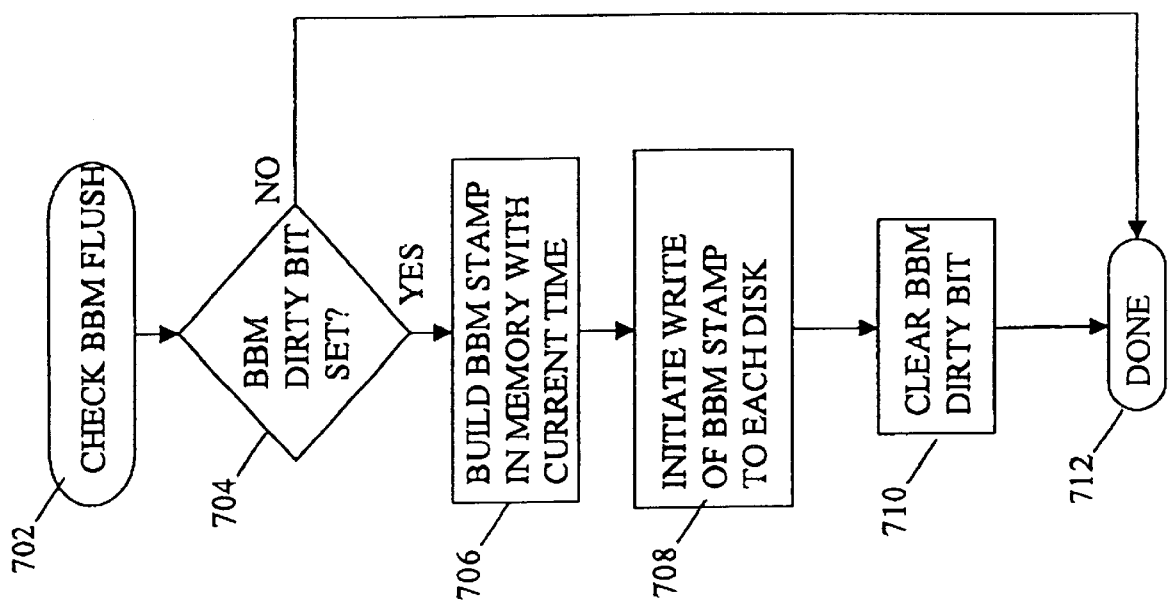
FIG. 7 is a flowchart of the subroutine which checks the validity of data loaded during a blocking/deblocking operation to perform read-modify-write to the disks.

FIG. 7 is a flowchart of the process CHECK BBM FLUSH which is performed periodically by the system tasks running on the CPU such that the process is guaranteed to be performed by a system task which alters the BBM MAP structure soon after that alteration is made. The process starts in block 702. In block 704, the BBM DIRTY bit of the BBM MAP structure is checked. If it is not set, the process completes in block 712. If the bit is set, a valid BBM STAMP is built in the controller's local memory containing the timestamp for the current time and all of the entries from the BBM TABLE which are linked in the BBM LIST in block 706. In block 708, write operations of the BBM STAMP onto a specific, reserved address of each disk in the array are initiated. The BBM DIRTY bit is then cleared in block 710 to indicate that the alterations to the map have been saved. The process then completes in block 712.

Figure 8:
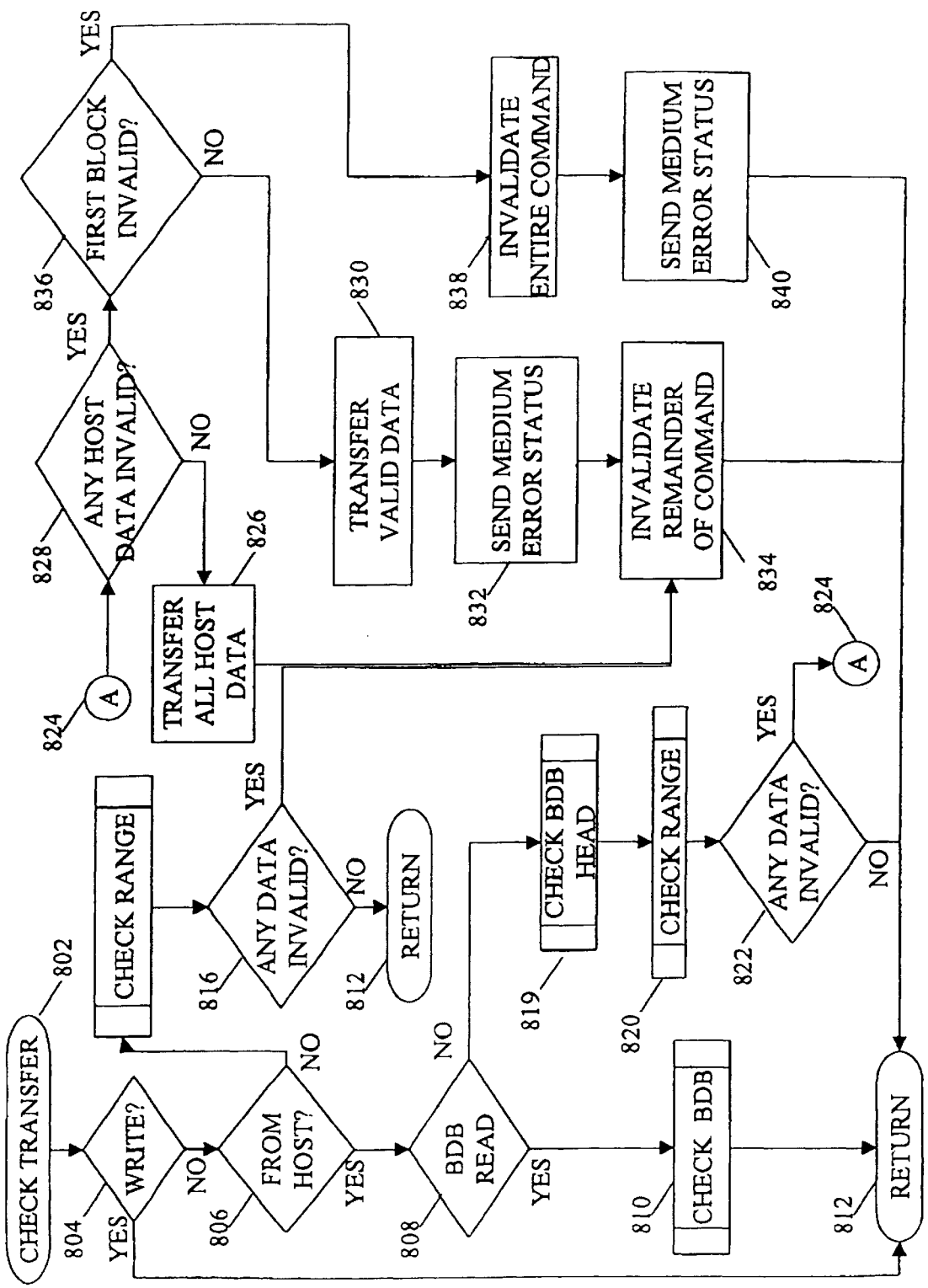
FIG. 8 is a flowchart of the routine which is invoked when an operation to the disks completes with bad status.

FIG. 8 is a flowchart of the process CHECK TRANSFER which is performed prior to any operation which accesses or alters data stored in the array. The process starts in block 802. In block 804, the direction of the operation is checked. If the operation writes data to the storage array, control is transferred to block 812, and the process completes.

For read operations, control is transferred to block 806, and the source of the command for the data transfer is checked. If the command originated from the host computer, control passes to block 808. Otherwise, the command is internally generated by the controller (such as the reconstruction of a disk or parity verification of a healthy array), and control passes to block 814, where the subroutine CHECK RANGE is called for the range of logical addresses described by the command. If no invalid blocks are present in the range, control is transferred to block 812, and the process completes. If there are invalid blocks in the range, control passes to block 834, where the region of the controller's cache memory which would receive the remainder of the data starting from the first invalid block is marked as invalid in order to prevent the invalid data from being transferred to the host as a cache hit. A means for selective invalidation of cache blocks is assumed, since the management of cache memory, including the invalidation of specific regions of a cache, is outside of the scope of the present invention. After cache invalidation is performed, control passes to block 812, and the process completes.

For read operations originating from the host computer, control passes to block 808, where it is checked whether the operation in question is a blocking/deblocking read operation to be performed before a host write. If so, control is transferred to the subroutine CHECK BDB in block 810, where the blocks loaded during the blocking/deblocking process are individually checked for validity and invalidated in cache if necessary. Control then passes to block 812, and the process completes.

For non-blocking/deblocking read operations originating from the host computer, control passes to block 819, where the subroutine CHECK BDB is called for the blocking/ deblocking head, if any, preceding the requested host data to prevent any invalid data from being transferred to the host as a cache hit. In block 820, the subroutine CHECK RANGE is called for the range of logical addresses to be read from the storage array. This range may include a blocking/ deblocking tail which will be loaded into memory along with the requested data. It may also include a lookahead, a number of blocks to be loaded sequentially after those blocks which the host requested. The technique of lookahead is well known in the art to enhance performance for hosts which are likely to access data from a storage system sequentially. In block 822 it is checked whether any of the data described by the command contains invalid blocks. If not, control passes to block 812, and the process completes. If there are invalid blocks in the range, control passes through connector 824 to block 828, where it is checked whether any of the data requested by the host is invalid. If not, control is transferred to block 826, and all of the requested data is transferred to the host, after which the invalid portion of the command is invalidated in the cache memory to prevent the invalid data from being transferred to the host as a cache hit.

If the invalid blocks are determined to fall within the portion of the command requested by the host, control is transferred to block 836, where it is checked whether the first block of data requested by the host is registered as invalid. If so, control passes to block 838, where the entire command is invalidated in the cache memory to prevent the invalid data from being transferred to the host as a cache hit. A MEDIUM ERROR status is then sent to the host in block 840, indicating the requested address as the location of the block in error. If some of the data requested by the host is valid, control passes to block 830 where all of the valid data requested is transferred to the host. In block 832, A MEDIUM ERROR status is then sent to the host indicating the first invalid address as the location of the block in error. Control then passes to block 812, and the process completes.

Figure 9:
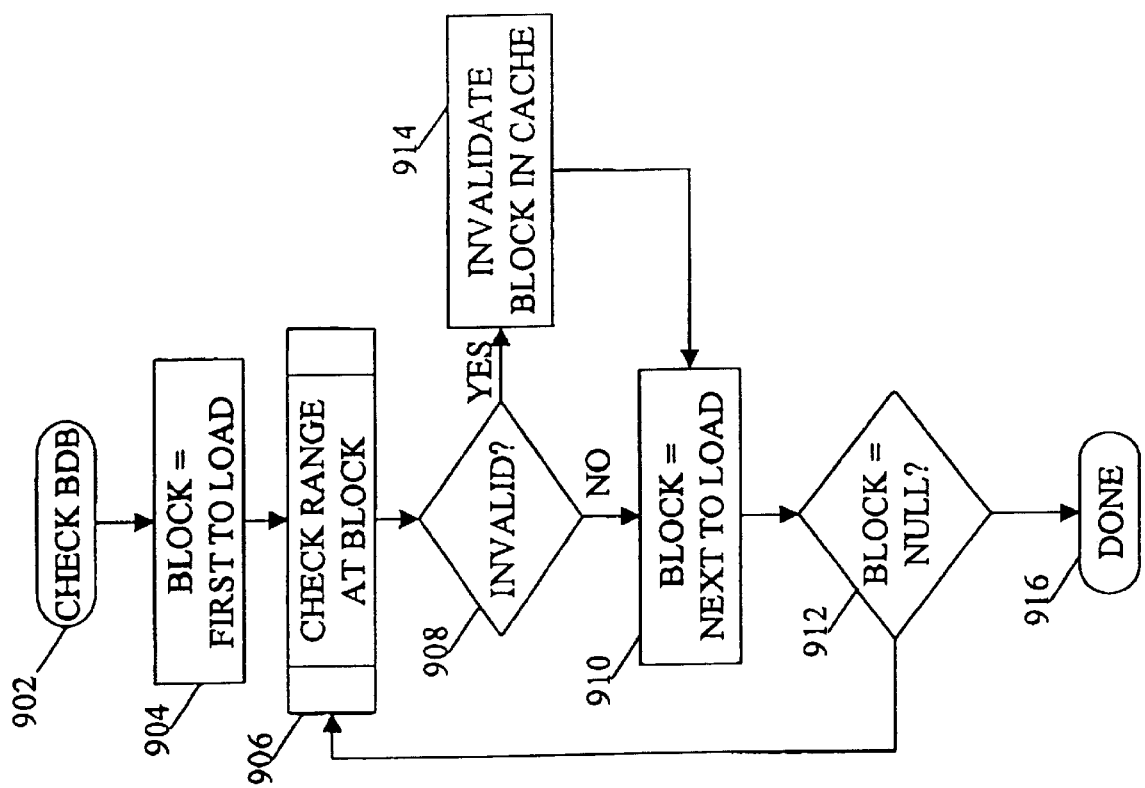
FIG. 9 is a flowchart of the subroutine which checks a given range of logical blocks for overlap with the invalid regions logged in the bad block table.

FIG. 9 is a flowchart of the subroutine CHECK BDB, which checks for invalid blocks loaded during a blocking/deblocking read operation. The process begins in block 902. In block 904, the variable BLOCK is set to the first logical block address which will be loaded by the operation. In block 906, the subroutine CHECK RANGE is called for the range of a single block at the address BLOCK. If the block is labeled as invalid in block 908, it is invalidated in cache in block 914. In block 910, BLOCK is set to the next block which will be loaded by the blocking/deblocking operation. If there are more blocks to load in block 912, control passes to block 906 for the next iteration of the loop. Otherwise, control passes to block 916, and the subroutine completes.

Figure 10:
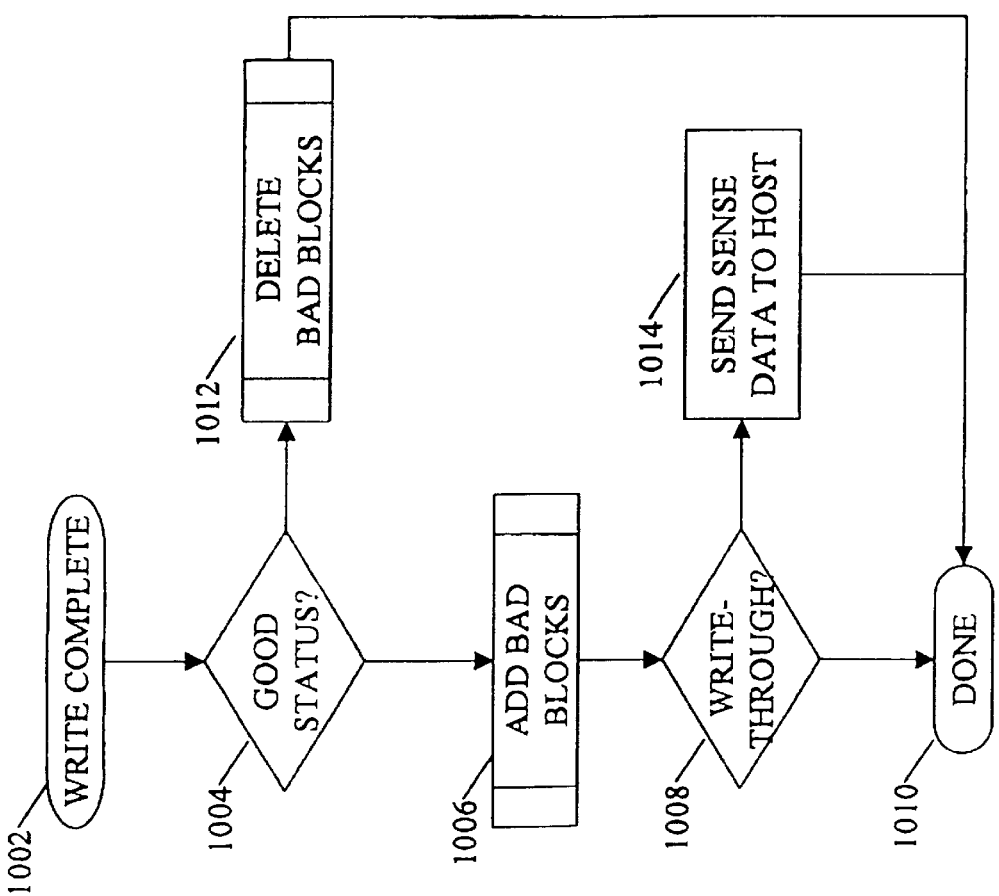
FIG. 10 is a flowchart of the subroutine which adds a range of logical blocks to the bad block table.

FIG. 10 is a flowchart of the process which is performed when a write operation to the storage array has been completed, successfully or unsuccessfully, by the controller. In the case of a failure, this process will only be called after the number of retries prescribed by the errorhandling policies of the controller have been performed. If the array has redundancy and errors occur on only one disk, the disk may be removed from operation prior to the invocation of this process, in which case the status of the write operation will be considered to be good. The process begins in block 1002. In block 1004, the status of the operation is checked. If the data have been successfully committed to all of the storage units involved, control passes to block 1012, where the subroutine DELETE BAD BLOCKS is invoked for the range of logical addresses described by the host command (not including blocking/deblocking heads or tails), indicating that the range of addresses contain valid host data. The subroutine then completes in block 1010. If the data was not successfully committed to the array even after retries and/or the removal of a redundant disk from operation, control passes to block 1006, where the subroutine ADD BAD BLOCKS is called for the range of logical addresses described by the command (including blocking/deblocking heads or tails). If the operation is determined to be a writethrough operation in block 1008, sense indicating the failure of the write is sent to the host in block 1014. If the operation is a write-back operation, the host cannot be immediately informed of the error, so control passes to block 1010 and the process completes.

Figure 11:
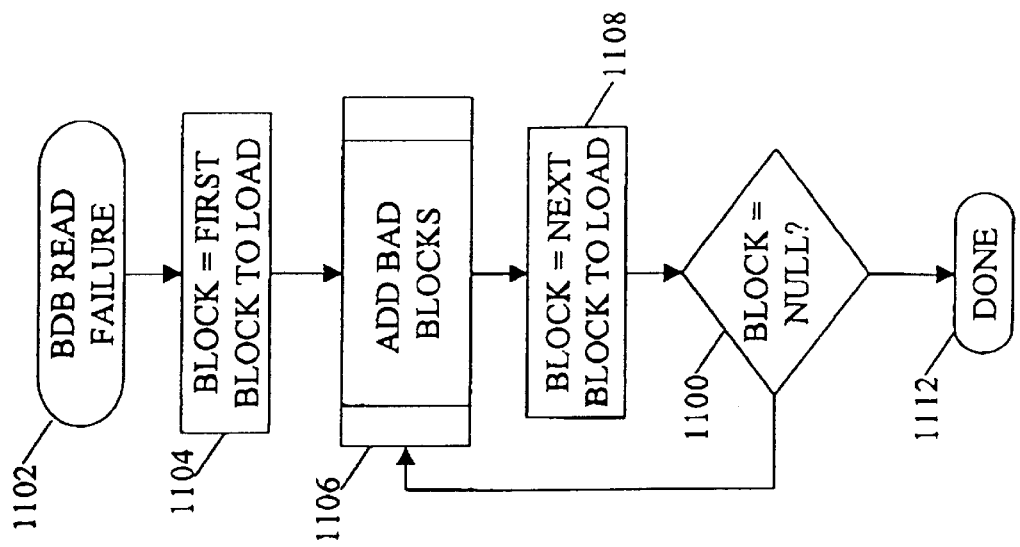
FIG. 11 is a flowchart of the subroutine which deletes a range of logical blocks from the bad block table.

FIG. 11 is a flowchart of the process which is performed when a blocking/deblocking read operation completes with a failure status after the prescribed number of retries. By invalidating the blocking/deblocking data rather than aborting the associated write command issued by the host computer, this routine favors data from the host over the data sharing the same physical blocks in the storage array. This policy is based on the fact that the write data from the host is known to contain data which the host uses, whereas the blocking/deblocking data may be in unused space. The process begins in block 1102. In block 1104, BLOCK is set to the logical address of the first logical block which would have been loaded by the blocking/deblocking operation. A call is made to the subroutine ADD BAD BLOCKS in block 1106 to add that block to the BBM MAP. In block 1108, BLOCK is set to the logical address of the next block which would have been loaded, and if there is such a block, control passes through block 1110 to block 1106 for another iteration of the loop. When there are no more blocks, control passes to block 1112, and the process completes.

Figure 12:
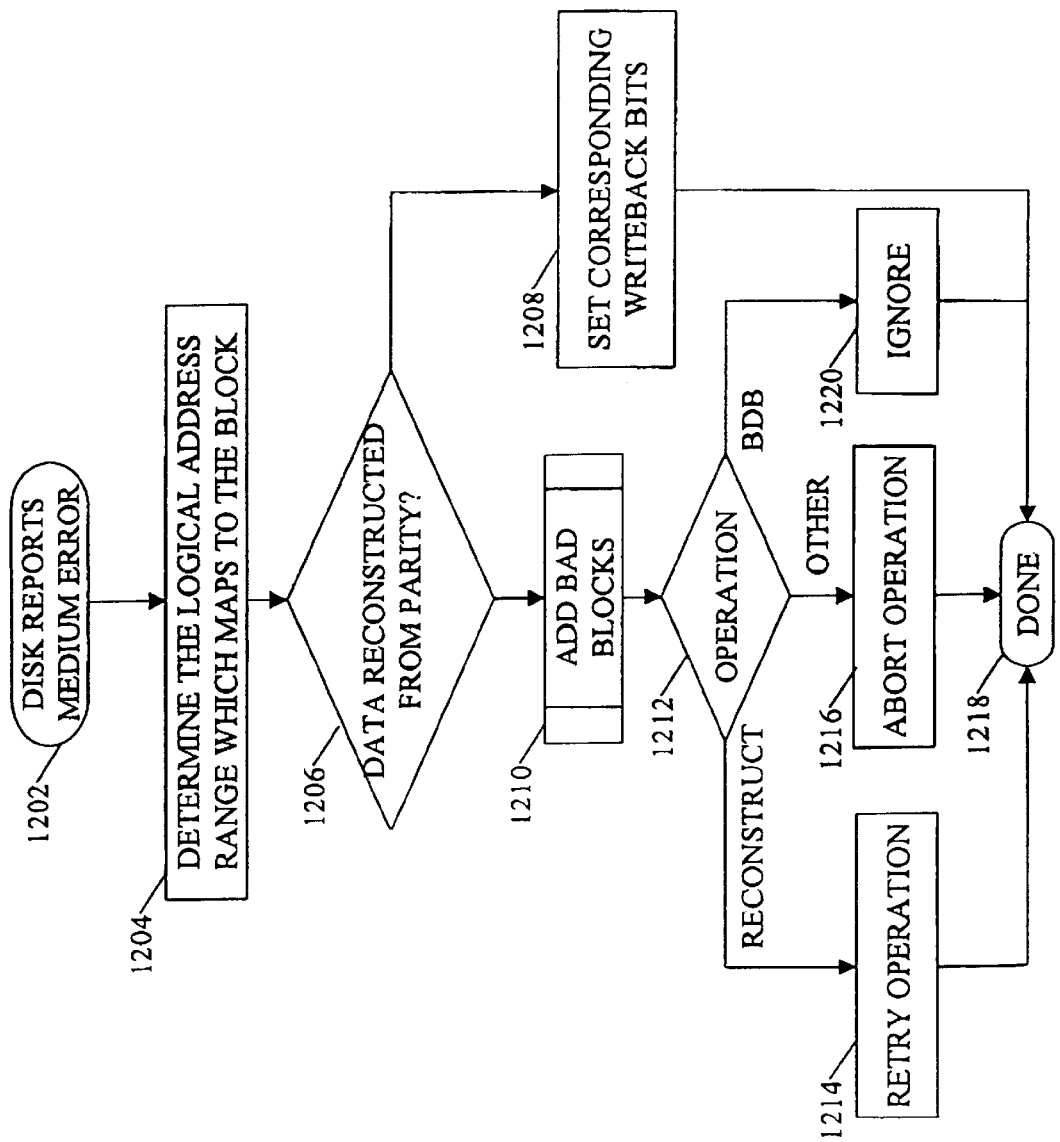
FIG. 12 is a flowchart of the process performed when a storage unit reports a medium error status on a read.

FIG. 12 is a flowchart of the process which is performed when a storage unit reports a MEDIUM ERROR status on a read. If the array is not in a redundant state, this process will be called in the case of failure only after the prescribed number of retries have expired. Since the DMA sync hardware automatically rebuilds the lost data into cache from parity without any additional read or parity-building operations, no retries need be performed when the array is in a redundant state. Additionally, the block containing physically flawed media may be remapped to a different location, either automatically by the storage device or using the SCSI REASSIGN BLOCKS (0x07) command. The process begins in block 1202. In block 1204, it is determined what range of logical addresses map into the disk block for which the medium error occurred. If the data is determined to have been successfully reconstructed by the DMA sync hardware in block 1206, writeback bits are set in the cache node descriptor corresponding to the logical address range where the error occurred and a writeback flush operation is queued for the cache node in order to write back the corrected data to the storage unit which reported the failure. If the data was not reconstructed, control passes to block 1210 where the subroutine ADD BAD BLOCKS is called to register the affected blocks as invalid in the BBM MAP. If the operation is determined to be a reconstruct in block 1212, it is given a RETRY status in block 1214. Since reconstruction often crosses large extents which have never been used by the host computer and which are likely to contain medium errors since they have not recently been written, and since the array can only be restored to redundancy by the completion of a reconstruction, it is desirable to allow many such reassignments to occur before aborting the operation. If the operation is determined to be a blocking/deblocking read in block 1212, control passes to block 1220 and the error, which has been documented in the BBM MAP, is ignored, allowing the associated host write to proceed. Other operations are given an ABORT status in block 1216, and the steps prescribed by the controller's error-handling policy for aborted commands are taken, including the sending of sense describing the error to the host, when appropriate.

Figure 13:
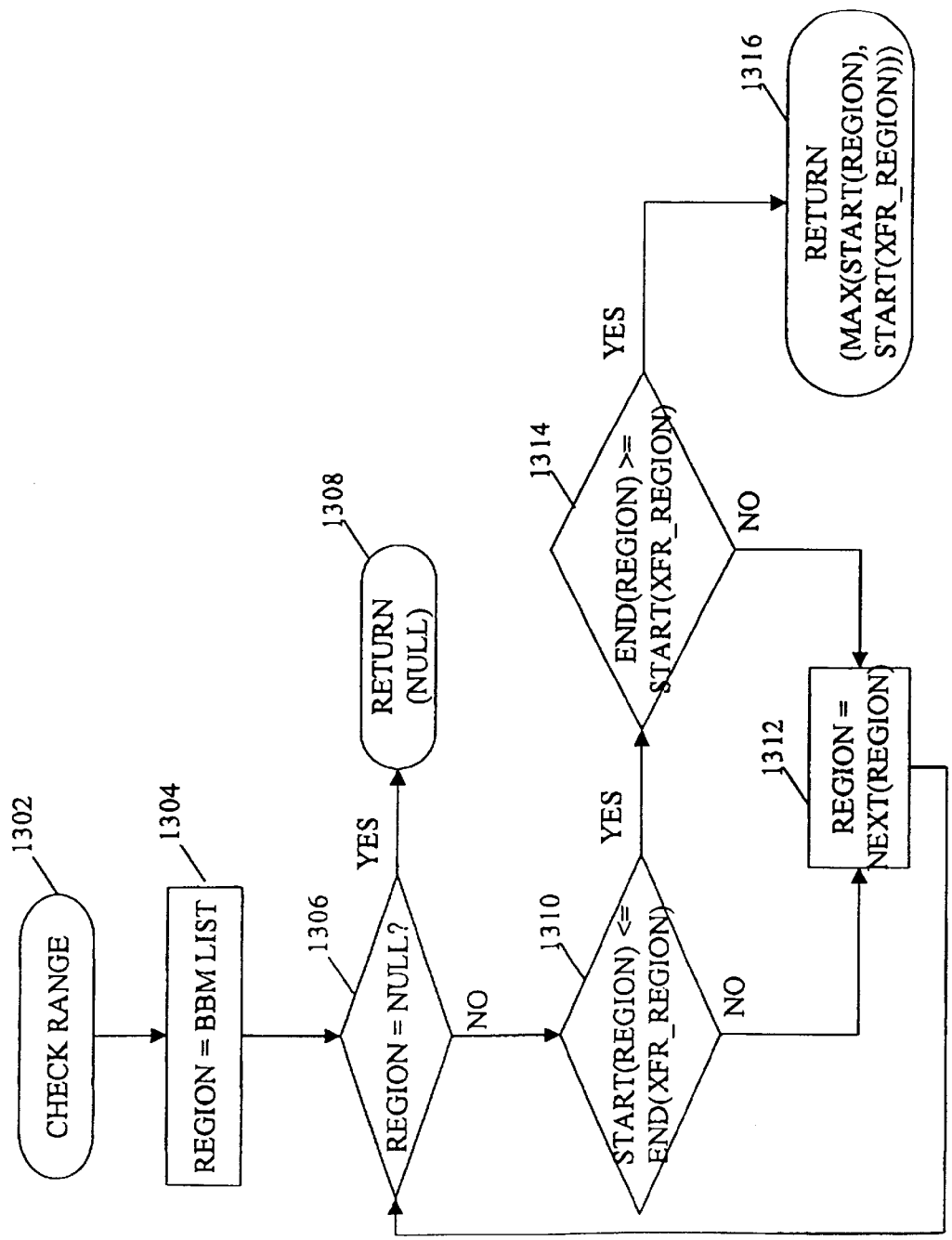
FIG. 13 is a flowchart of the change range subroutine.

FIG. 13 is a flowchart of the CHECK RANGE subroutine, which determines whether any logical blocks within a given range on a given LUN are listed as invalid in the BBM MAP and, if so, returns the address of the first invalid block in the range. The subroutine begins in block 1302. In block 1304, the BBM LIST is assigned to the local pointer variable REGION. If REGION is null, the range to be checked does not overlap any bad blocks and the subroutine returns null in block 1308. If REGION is non-null, control passes to block 1310 where the first block of the invalid region designated by REGION is compared to the last block of the region to be checked, designated by $XFR_{13}REGION$. There can be no overlap if $START(REGION) > END(XFR_{13}REGION)$, in which case control passes to block 1312, where the pointer REGION is set to the next entry in the BBM LIST, and then to block 1306 for another iteration of the loop. If START (REGION)<=END(XFR$_{13}$REGION), there is a possibility of overlap, so the last block of REGION is compared with the first block of XFR$_{13}$REGION in block 1314. If END (REGION) >=START(XFR$_{13}$REGION), the two regions overlap, so the greater of START(REGION) and START (XFR$_{13}$REGION) is returned by the subroutine in block 1316 as the first invalid block in the given range. Otherwise, there is no overlap, and control passes to block 1312 to examine the next entry in the list.

Figure 14A:
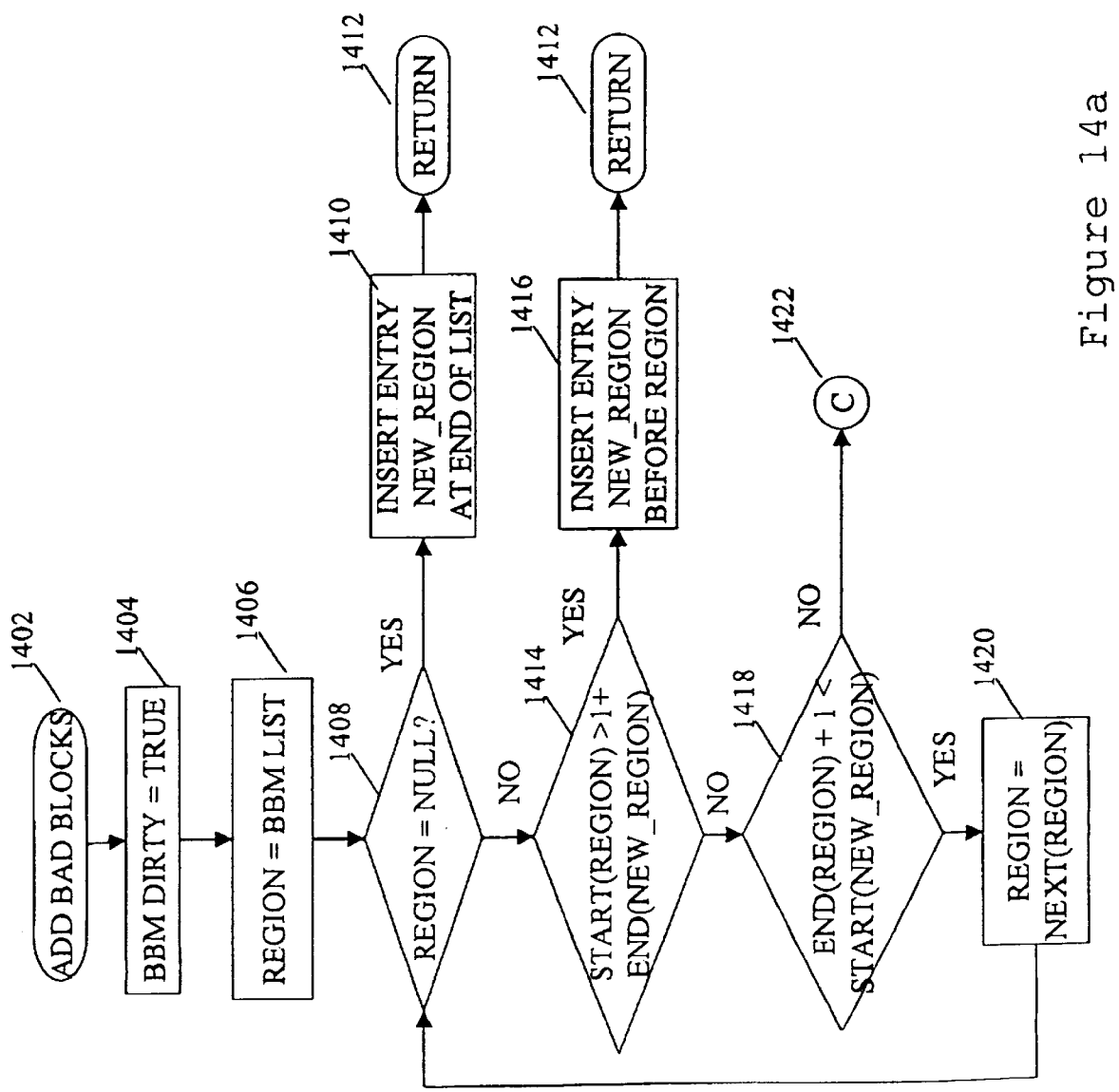
FIGS. 14a and 14b are flowcharts of the subroutine called when a region of the array is determined to be invalid.

FIG. 14 is a flowchart of the subroutine ADD BAD BLOCKS, which is called when a region of the array is determined to be invalid. The subroutine begins in block 1402 of FIG. 14a. In block 1404, the bit BBM DIRTY is set to indicate that a write of the BBM MAP to disk will need to occur. In block 1406, the BBM LIST is assigned to the local pointer variable REGION. If REGION is null in block 1408, the range does not precede or overlap any entries in the BBM LIST and is inserted at the end of the list in block 1410. The subroutine then completes in block 1412. If REGION is non-null, the first block of REGION is compared to the block after the last block of the region to be added, designated as NEW$_{13}$REGION, in block 1414. If START(REGION)>1+END(NEW$_{13}$REGION), then NEW$_{13}$REGION precedes REGION, and the two do not need to be merged into a single descriptor. Control passes to block 1416, where the descriptor for NEW$_{13}$REGION is inserted in front of REGION in the BBM LIST. The subroutine then completes in block 1412. Otherwise, the block after the last block of REGION is compared with the first block of NEW$_{13}$REGION. If END(REGION)+1<START (NEW$_{13}$REGION), then REGION precedes NEW$_{13}$REGION and the two do not need to be merged into a single descriptor. Control then passes to block 1420, where REGION is set to the next entry in the BBM LIST, and then to block 1408 for the next iteration of the loop.

Figure 14B:
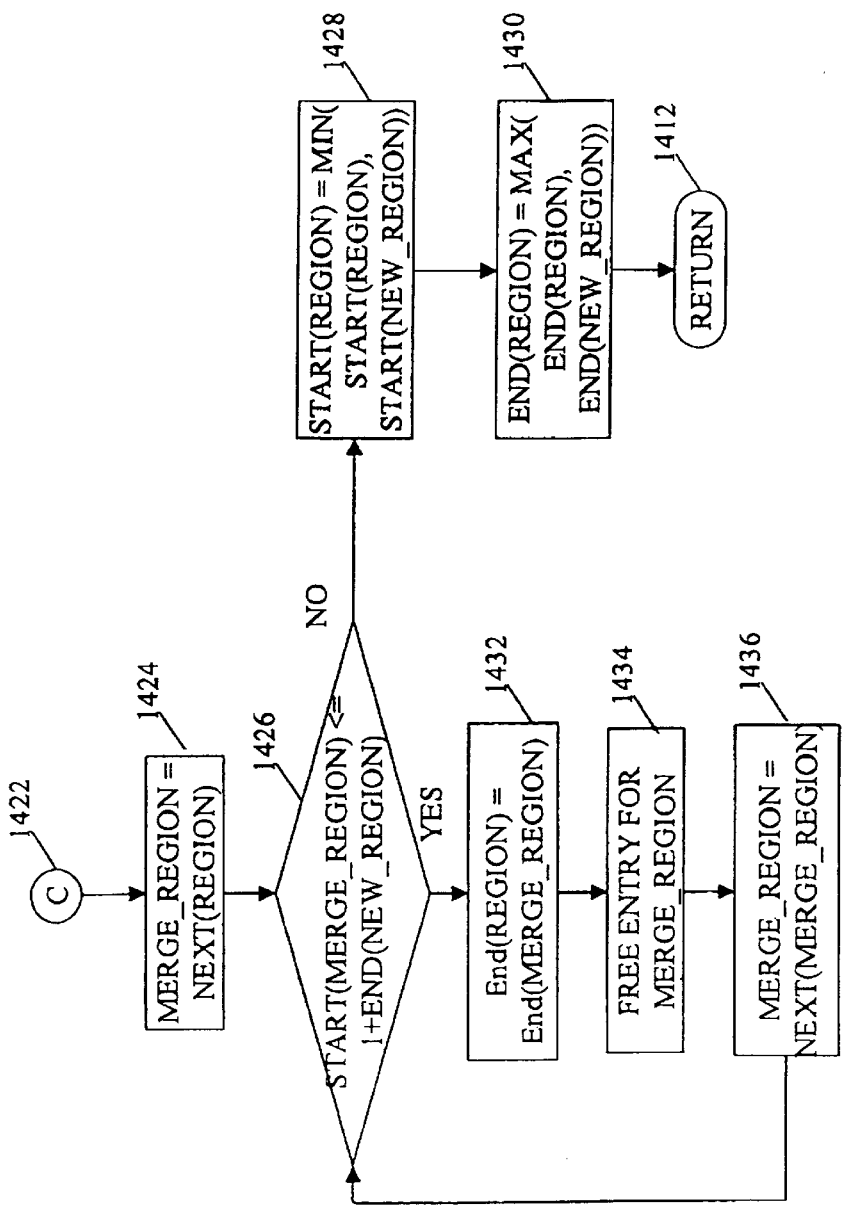

In the case where descriptors need to be merged, control passes through connector 1422 to block 1424 of FIG. 14b, where a new local pointer variable, MERGE$_{13}$REGION, which is used to determine whether any entries in the BBM TABLE are entirely contained within NEW$_{13}$REGION and must be deleted, is initialized to point to the next entry after REGION in the BBM LIST. Because the list is ordered, MERGE$_{13}$REGION is known to start after the first block of NEW$_{13}$REGION. In block 1426, the first block of MERGE$_{13}$REGION is compared to the block after the last block of NEW$_{13}$REGION. If START(MERGE$_{13}$REGION) <=1+END(NEW$_{13}$REGION), MERGE$_{13}$REGION is entirely contained within NEW$_{13}$REGION and is merged with REGION in block 1432. The descriptor of MERGE$_{13}$REGION can then be returned to the list of free descriptors in block 1434, and the pointer is advanced to the next entry in the list in block 1436. This process repeats until MERGE$_{13}$REGION is determined to be disjoint from NEW$_{13}$REGION in block 1426.

When all descriptors contained within NEW$_{13}$REGION have been merged, control passes to block 1428, where the first block of REGION is set to be the lesser of the first block of REGION and the first block of NEW$_{13}$REGION. In block 1430, the last block of REGION is set to be the greater of the last block of REGION, which in the loop in the preceding paragraph will have been set to the last block of the last region to be merged, and the last block of NEW$_{13}$REGION. The subroutine then completes in block 1412.

Figure 15A:
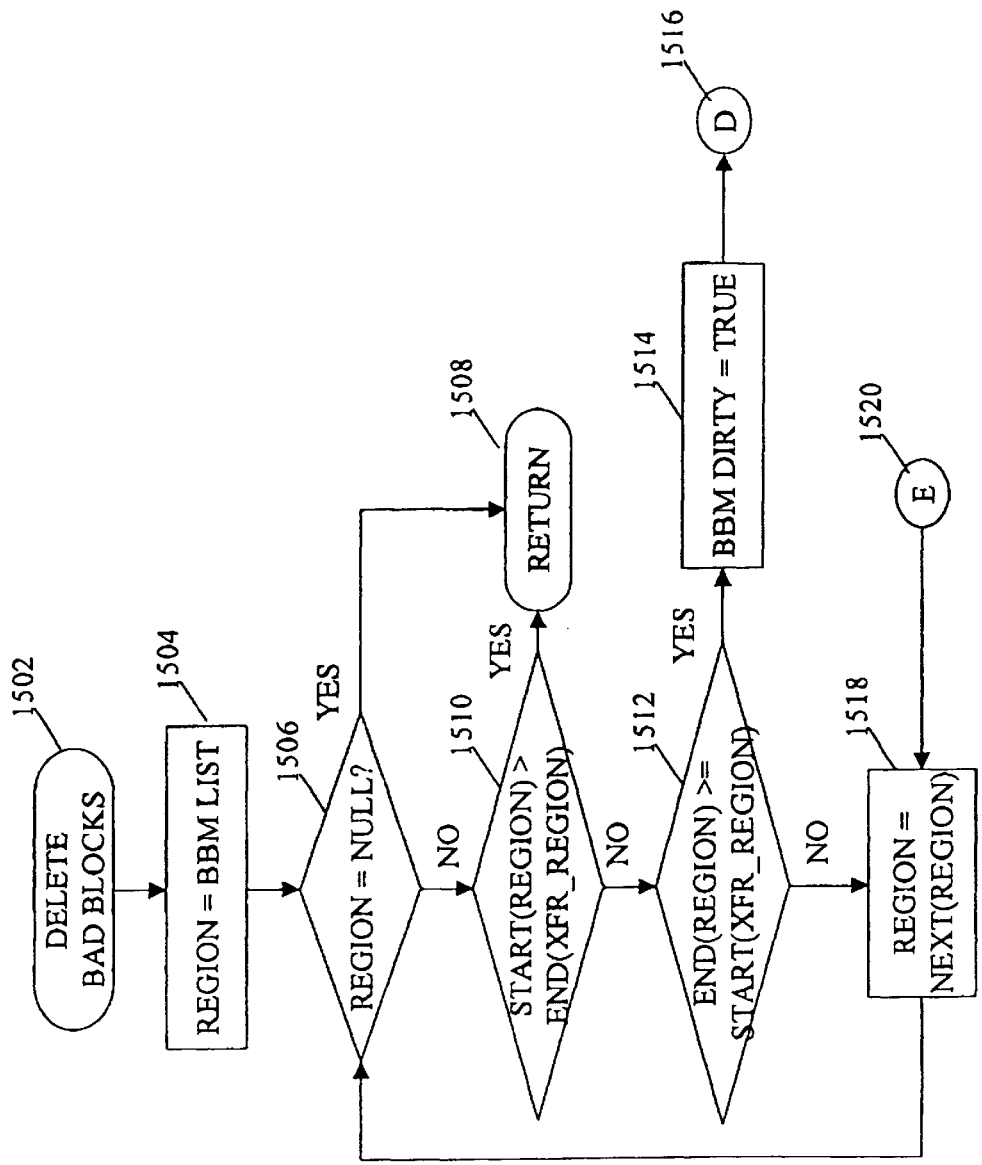
FIGS. 15a and 15b are flowcharts of the subroutine called when a write operation successfully commits data to the storage array.

FIG. 15 is a flowchart of the subroutine DELETE BAD BLOCKS, which is called when a write operation successfully commits data to the storage array. The subroutine begins in block 1502 of FIG. 15a. In block 1504, the BBM LIST is assigned to the local pointer variable REGION. If REGION is null in block 1506, the range of blocks is not listed in the BBM MAP, so the subroutine completes in block 1508. If REGION is non-null, but in block 1510 the first block of REGION succeeds the last block of the region to be deleted, designated as XFR$_{13}$REGION, there can be no more entries in the list to be deleted, and the subroutine completes in block 1508. Otherwise, the last block of REGION is then compared to the first block of the region to be deleted in block 1512. If END(REGION)<START (XFR$_{13}$REGION), the regions are disjoint, and control passes to block 1518, where REGION is set to the next entry in the BBM LIST, and then to block 1506 for the next iteration of the loop. Otherwise, there is overlap, and part or all of REGION must be deleted. In this case, the BBM DIRTY bit is set in block 1514 to indicate that the BBM MAP will need to be saved to disk and control passes through connector 1516 to block 1522.

Figure 15B:
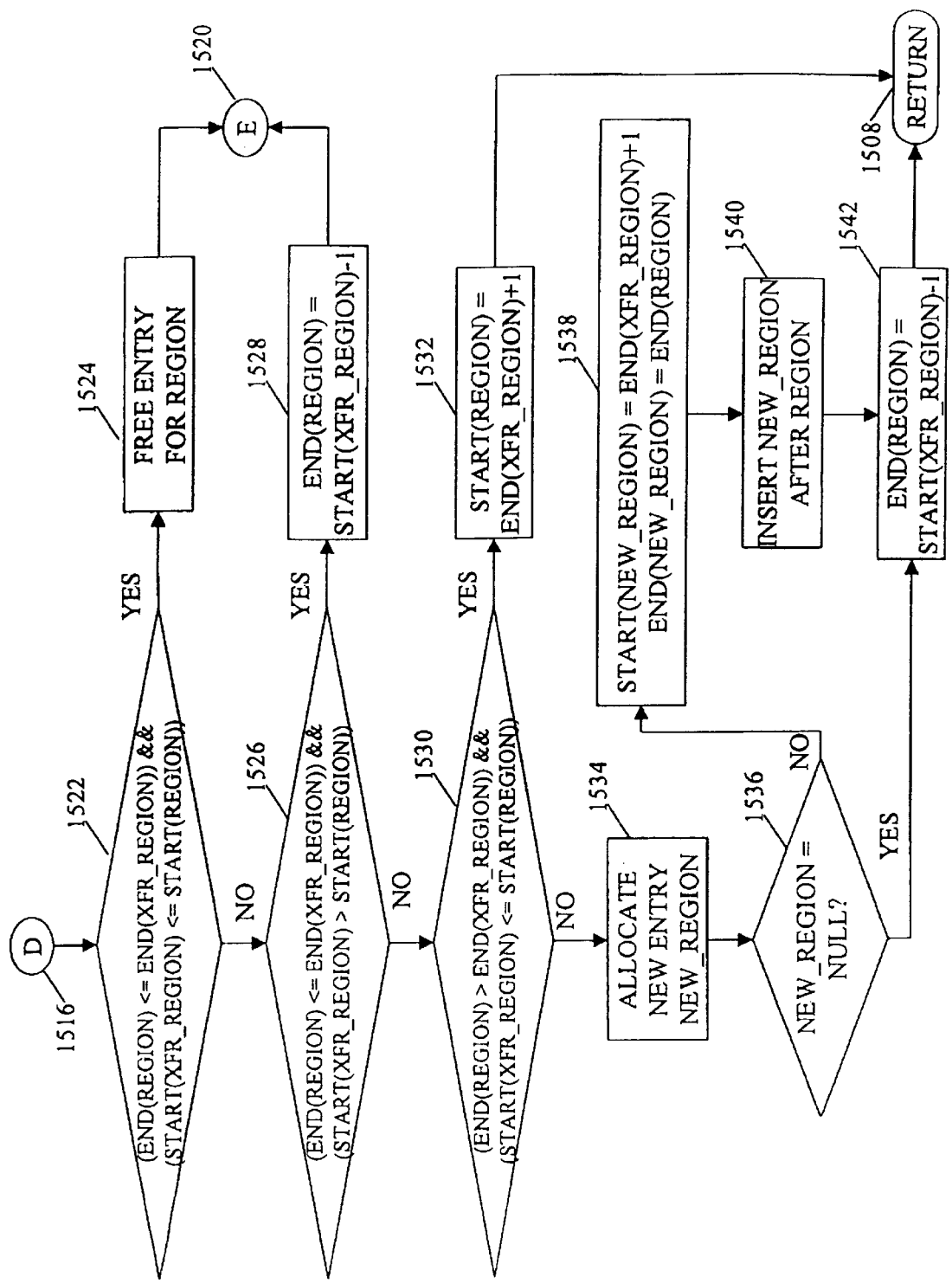

The flowchart of FIG. 15b shows the various cases of deletion of the portions of REGION which overlap XFR$_{13}$REGION. In block 1522, it is checked whether REGION both ends before the end of XFR$_{13}$REGION and begins after the beginning of XFR$_{13}$REGION. In this case, REGION is entirely contained within XFR$_{13}$REGION, and its descriptor is deallocated in block 1524. Control then passes through connector 1520 back to the main loop to check the next entry in the BBM LIST. In block 1526, it is checked whether REGION ends before the end of XFR$_{13}$REGION but starts before XFR$_{13}$REGION. In this case, there are blocks at the head of REGION which are still invalid, so the end of REGION is set to the block before the first block of XFR$_{13}$REGION. Control then passes through connector 1520 back to the main loop to check the next entry in the BBM LIST. In block 1530, it is checked whether REGION begins after the beginning of XFR$_{13}$REGION but ends after the last block of XFR$_{13}$REGION. In this case, there are blocks at the tail of REGION which are still invalid, so the start of REGION is set to the block after the last block of XFR$_{13}$REGION.

If none of the above are the case, XFR$_{13}$REGION must be contained within REGION. In this case the descriptor of REGION should be broken in two. A new descriptor is allocated in block 1534. If no descriptor is available in block 1536, REGION is truncated to end at the block before XFR$_{13}$REGION in block 1542. If the allocation is successful, NEW$_{13}$REGION is set to begin from the block after the end of XFR$_{13}$REGION and end at the end of REGION in block 1538. NEW$_{13}$REGION is then inserted in the list after REGION in block 1540. REGION is then truncated to end at the block before XFR$_{13}$REGION in block 1542. The subroutine then completes in block 1508.

It will be apparent to those skilled in the art that the examples and embodiments described herein are by way of illustration and not of limitation, and that other examples may be used without departing from the spirit and scope of the present invention, as set forth in the claims.

I claim:

1. A method for designating physically or logically invalid regions of storage units in a fault-tolerant storage device array comprising a plurality of failure independent storage units for storing information which receive information from a writeback-cache, and a controller having a writeback-cache comprising the steps:

a. determining the logical address and length of each physically or logically invalid region, b. writing the logical address and length of each physically or logically invalid region on a bad region table, and c. replicating the bad region table on two or more but less than all of the storage units.

2. A method for designating physically or logically invalid regions of storage units in a fault-tolerant storage device array comprising a plurality of failure independent storage units for storing information which receive information from a writeback-cache, and a controller having a writeback-cache comprising the steps:

a. determining the logical address and length of each physically or logically invalid region, b. writing the logical address and length of each physically or logically invalid region on a bad region table, and c. replicating the bad region table on stable storage units separate from the array of storage units.

3. A method for designating as invalid either a whole or fractional number of blocks or regions on a plurality of storage units across which data has been striped after physical error or corruption on a storage unit or storage units in the plurality have occurred in a fault-tolerant storage device array comprising a plurality of failure independent storage units for storing information which receive information from a writeback cache, and a controller having a writeback-cache comprising the steps:

a. determining the physical address and length of each block or region of physical error or corruption, b. determining the set of logical blocks which map onto the region of physical corruption, c. determining the subset of the logical blocks from step b which are made logically invalid due to the physical error or corruption, and d. replicating the bad region table on two or more but less than all of the storage units.

4. A method for designating as invalid either a whole or fractional number of blocks or regions on a plurality of storage units across which data has been striped after physical error or corruption on a storage unit or storage units in the plurality have occurred in a faulttolerant storage device array comprising a plurality of failure independent storage units for storing information which receive information from a writeback cache, and a controller having a writeback-cache comprising the steps:

a. determining the physical address and length of each block or region of physical error or corruption, b. determining the set of logical blocks which map onto the region of physical corruption, c. determining the subset of the logical blocks from step b which are made logically invalid due to the physical error or corruption, d. recording the logical address and length of all logically invalid ranges of blocks, and e. replicating the bad region table on stable storage units separate from the array of storage units.

* * * * *